April 15, 1924.
P. DARABOS
SAWING MACHINE
Filed May 4, 1923
1,490,597
2 Sheets-Sheet 2
FIG. 4.   FIG. 2.   FIG. 3.
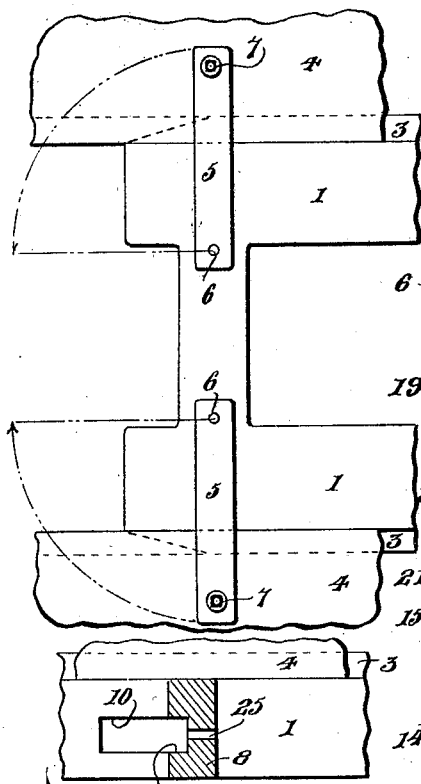
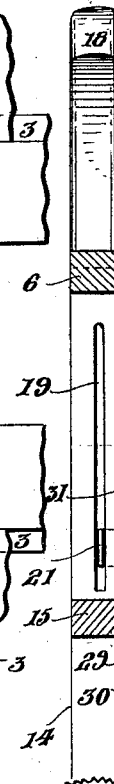
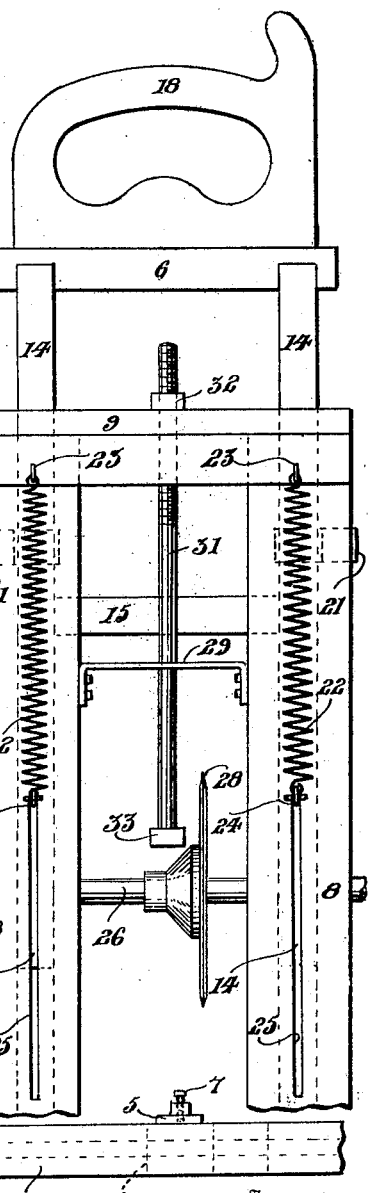
FIG. 5.
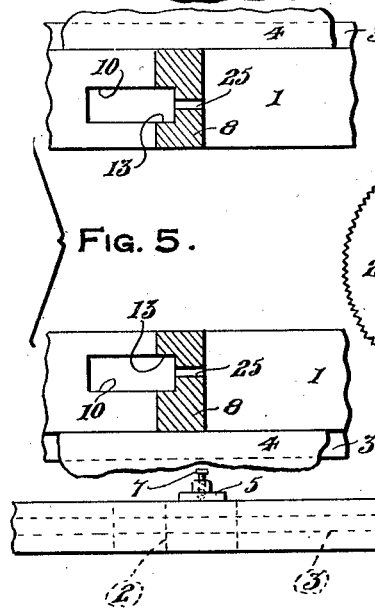
Inventor
P. Darabos
By
F. B. Bryant
Attorney.

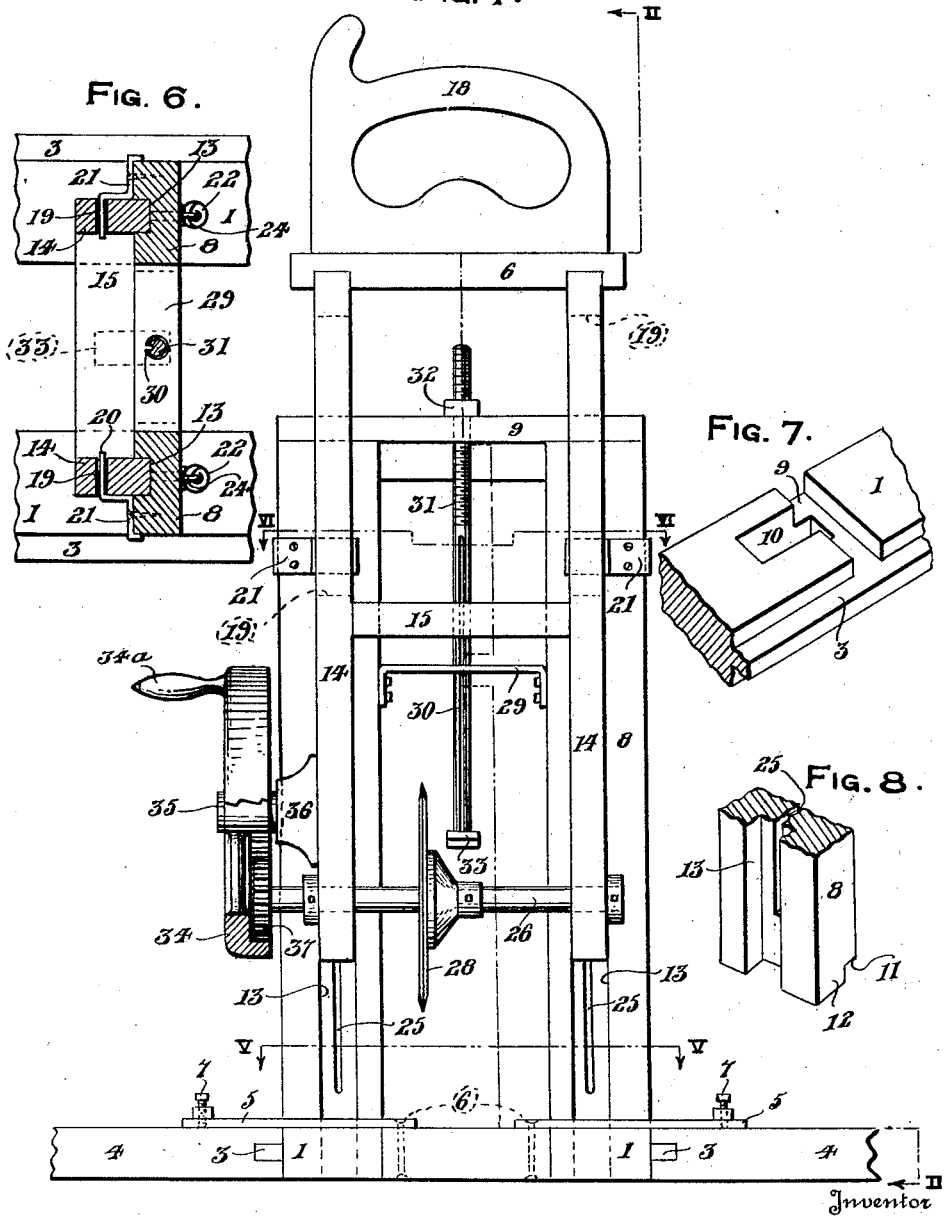

Patented Apr. 15, 1924.

1,490,597

UNITED STATES PATENT OFFICE.

PETER DARABOS, OF OAKDALE, PENNSYLVANIA.

SAWING MACHINE.

Application filed May 4, 1923. Serial No. 636,588.

*To all whom it may concern:*

Be it known that I, PETER DARABOS, a citizen of the United States of America, residing at Oakdale, in the county of Allegheny and State of Pennsylvania, have invented certain new and useful Improvements in Sawing Machines, of which the following is a specification.

This invention relates to certain new and useful improvements in saws and has particular reference to a saw that is power operated and in the form of a disk that is supported upon a tensioned shiftably mounted frame for moving the circular saw into engagement with work disposed beneath the same A further object of the invention is to provide a novel type of supporting frame structure for a circular saw embodying a tensioned shiftably mounted frame supporting the saw and having cooperating devices carried by the frame structure for limiting movement of the shiftably mounted frame and saw carried thereby in directions toward the work.

The invention further embodies a novel construction of supporting frame work for a circular saw that is adjustably mounted upon a table or bench by a tongue and groove connection with devices for retaining the frame structure in a rigid position upon the bench.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a front elevational view of a sawing machine constructed in accordance with the present invention showing the vertically shiftable tensioned frame supporting the circular saw and the adjustable device for limiting downward movement thereof, Figure 2 is a vertical cross sectional view taken on line II—II of Fig. 1 showing the springs for tensioning the saw carrying frame, Figure 3 is a fragmentary rear elevational view of the machine, Figure 4 is a fragmentary top plan view of a portion of the base of the machine showing the table or bench support for the same, Figure 5 is a horizontal sectional view taken on line V—V of Fig. 1 showing the spaced vertical side bars of the rigid saw frame, Figure 6 is a horizontal sectional view taken on line VI—VI of Fig. 1 showing the guide means for the tensioned shiftable saw supporting frame, Figure 7 is a fragmentary perspective view of one of the base bars of the frame, and Figure 8 is a fragmentary perspective view of the lower end of one of the vertical side bars of the rigid frame.

The sawing machine disclosed in this application includes a vertical frame supporting a circular saw, the vertical frame being mounted upon base bars 1 connected adjacent their opposite ends by cross bars 2, the outer edges of the base bars 1 carrying longitudinally extending tongues 3 that are slidably received in grooves formed in the table or bench 4 as shown in Fig. 4, the base frame including the side bars 1 being anchored in adjusted positions by the straps 5 permanently connected as at 6 to the base bars 1 adjacent opposite ends with the outer ends thereof detachably connected as at 7 to the bench 4, it being understood that the frame structure of the sawing machine is supported on the bench 4 by the tongue and groove connection therewith providing a central opening through the bench between the side bars 1 as clearly shown in Fig. 4.

The vertical frame includes spaced side bars 8 rigidly mounted at their lower ends upon the base bars 1, the upper ends of the side bars 8 being connected by a cross head 9. The connection between the lower ends of the side bars 8 and base bars 1 is shown more clearly in Figs. 7 and 8, the base bar 1 having a transverse groove 9 formed in the upper face thereof with the bottom wall of the groove flush with the adjacent face of the tongue 3 while a longitudinally extending opening 10 is formed in the bar 1 and opens into the groove 9 as illustrated in Fig. 7. The lower rear edge of the side bar 8 is cutaway to provide a cross shoulder 11 and a depending foot 12, the shoulder 11 resting upon the upper face of the bar 1 while the foot 12 extends into the groove 9, the front face of each side bar 8 being provided with a groove 13 extending the entire length thereof and in registration with the opening 10 in the base bar. The lower ends of the side bars may be further secured in the base bars 1 in any suitable manner to provide for a rigid frame structure supporting the saw blade.

A tensioned vertically shiftable saw supporting frame is slidably mounted in the grooves 13 of the side bars 8 and includes side bars 14 connected intermediate their ends by a cross plate 15 while the upper ends are connected by a cross head 16 carrying an operating handle 18 in the form of a conventional saw handle as shown in Figs. 1 and 3. The side bars 14 are slidable in the grooves 13 of the bars 8, each side bar 14 being transversely slotted as at 19, shown in Fig. 6, into which slot guide arms 20 of angle brackets 21 extend, the angle bracket being anchored to the front faces of the side bars 8 as clearly illustrated in Figs. 1 and 6. To place the vertically slidable frames under tension, a coil spring 22 is associated with each pair of guide bars 8 and 14, the coil springs being positioned rearwardly of the frame and each secured at its upper end to a hook 23 carried by the cross head 9 of the rigid frame while the lower end of each spring is attached to a pin 24 that extends through a slot 25 provided in the adjacent side bar 8 for attachment to the rear face of the adjacent side bar 14 for normally holding the vertically shiftable frame at its limit of upward movement with the pins 24 engaging the upper ends of the slots 25.

A shaft 26 is journaled transversely of the lower ends of the side bars 14 and has a circular saw 28 fixed thereto between the side bars. Driving means for the shaft 26, includes an internal gear 34 journaled on the stub shaft 35 carried by the bracket 36 secured to a side bar 14, a pinion 37 secured to the adjacent end of the shaft 26 meshing with the internal gear 34 that is rotated through the medium of the handle 34ª carried by the internal gear.

Means for limiting the downward movement of the sliding saw supporting frame toward the bench 4 includes a cross arm 29 extending between the side bars 8 and through which the splined portion 30 of the screw shaft 31 slidably extends, the upper end of the screw shaft 31 being threaded through the cross head 9 of the rigid frame and retained in adjusted positions by the set nut 32, the lower end of the splined portion 30 of the screw shaft carrying a laterally directed foot 33 positioned in the downward path of movement of the cross brace 15 upon the sliding saw frame.

From the above detail description of the device, it is believed that the construction and operation thereof will at once be apparent, it being noted that the base frame including the base bars 1 are adjustably mounted upon the table or bench support 4 while work positioned above the bench and beneath the saw 28 is engaged thereby upon downward pressure of the vertically shiftable saw supporting frame against the tension of the springs 22, the saw supporting frame being automatically elevated when pressure is relieved thereon. Downward movement of the frame is limited by the foot 33 upon the screw rod 31 that is adjustable to vary the length of movement of the saw carrying frame.

While there is herein shown and described the preferred embodiment of the present invention, it is nevertheless to be understood that minor changes may be made therein without departing from the spirit and scope of the invention as claimed.

What is claimed as new is:—

1. In a sawing machine, a vertical rigid frame, a tensioned vertically shiftable frame slidable on the rigid frame, a circular saw carried by the shiftable frame, the rigid frame including spaced side bars having vertical grooves therein, the shiftable frame including spaced side bars slidable in the grooves of the rigid side bars, the side bars of the slidable frame having elongated slots therein, and guide fingers carried by the rigid side bars extending into said slots.

2. In a sawing machine, a vertical rigid frame, a tensioned vertically shiftable frame slidable on the rigid frame, a circular saw carried by the shiftable frame, the rigid frame including spaced side bars having vertical grooves therein, the shiftable frame including spaced side bars slidable in the grooves of the rigid side bars, the side bars of the slidable frame having elongated slots therein, guide fingers carried by the rigid side bars extending into said slots, the rigid side bars having elongated slots therein, springs anchored at their upper ends to the rigid frame and pins carried by the lower ends of the slidable side bars extending through the slots in the rigid bars and attached to the lower ends of the springs.

In testimony whereof I affix my signature.

PETER DARABOS.